US006845784B2

(12) United States Patent
Pascznk

(10) Patent No.: US 6,845,784 B2
(45) Date of Patent: Jan. 25, 2005

(54) FIRE SPRINKLER WATER CATCHING APPARATUS

(76) Inventor: James J. Pascznk, 343 Columbine Ct., Vacaville, CA (US) 95687

(*) Notice: Subject to any disclaimer, the term of this patent is extended or adjusted under 35 U.S.C. 154(b) by 0 days.

(21) Appl. No.: 10/686,301

(22) Filed: Oct. 15, 2003

(65) Prior Publication Data

US 2004/0123904 A1 Jul. 1, 2004

Related U.S. Application Data

(60) Provisional application No. 60/430,134, filed on Dec. 2, 2002.

(51) Int. Cl.[7] .......................... B05B 1/28; B05B 15/04; B05B 15/06; F16L 24/02

(52) U.S. Cl. ......................... 137/312; 137/357; 141/86; 141/87; 141/337; 169/91; 220/571; 222/108; 239/121; 285/8; 285/13

(58) Field of Search ................................ 137/313, 357, 137/360, 312; 141/87, 86, 88, 337; 169/37; 239/104, 120, 121, 124; 285/8, 13; 220/571, 573; 222/108

(56) References Cited

U.S. PATENT DOCUMENTS

| | | | | | |
|---|---|---|---|---|---|
| 4,245,666 | A | * | 1/1981 | Norris | 137/357 |
| 4,313,457 | A | * | 2/1982 | Cliff | 137/312 |
| 4,339,048 | A | | 7/1982 | McMillen et al. | |
| 4,373,547 | A | | 2/1983 | Geis et al. | |
| 4,546,900 | A | | 10/1985 | Lackey | |
| 4,784,184 | A | * | 11/1988 | Gates | 138/109 |
| 4,809,734 | A | * | 3/1989 | Cliff | 137/312 |
| 4,883,102 | A | * | 11/1989 | Gabrielyan et al. | 141/98 |
| 5,052,149 | A | * | 10/1991 | Johnson | 47/67 |
| 5,101,868 | A | * | 4/1992 | Balch | 141/86 |
| 5,172,718 | A | * | 12/1992 | Thornburgh | 137/312 |
| 5,183,280 | A | | 2/1993 | Gresch | |
| 5,344,193 | A | * | 9/1994 | Rio | 137/312 |
| 5,381,839 | A | * | 1/1995 | Dowd | 141/88 |
| 5,404,899 | A | * | 4/1995 | Zabel et al. | 137/272 |
| 5,725,009 | A | | 3/1998 | Mallow et al. | |
| 5,752,540 | A | * | 5/1998 | Hansel, Sr. | 137/312 |
| 6,227,232 | B1 | * | 5/2001 | Williams, Sr. | 137/312 |

* cited by examiner

*Primary Examiner*—George L. Walton

(57) ABSTRACT

A fire sprinkler water catching apparatus includes a funnel member which has a funnel top portion, a funnel bottom portion, a funnel drain portion connected to the funnel bottom portion, and a pole-reception fitting. A drain hose is connected to the funnel drain portion. The end of a support pole is received in the pole-reception fitting. The fire sprinkler water catching apparatus of the invention is used to catch and carry away unwanted water that is sprayed from a fire sprinkler when the fire sprinkler is spraying water at an unwanted time, such as when a fusible link on the fire sprinkler is accidentally broken. Preferably, a flexible funnel cover is fitted onto the top of the funnel top portion. The flexible funnel cover includes a plurality of flexible and resilient funnel cover flaps.

7 Claims, 3 Drawing Sheets

FIG 3
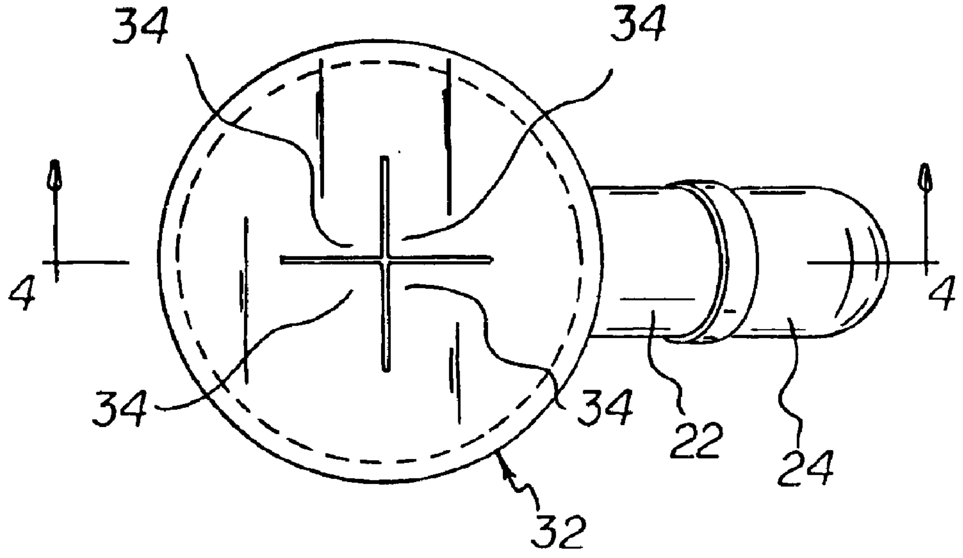
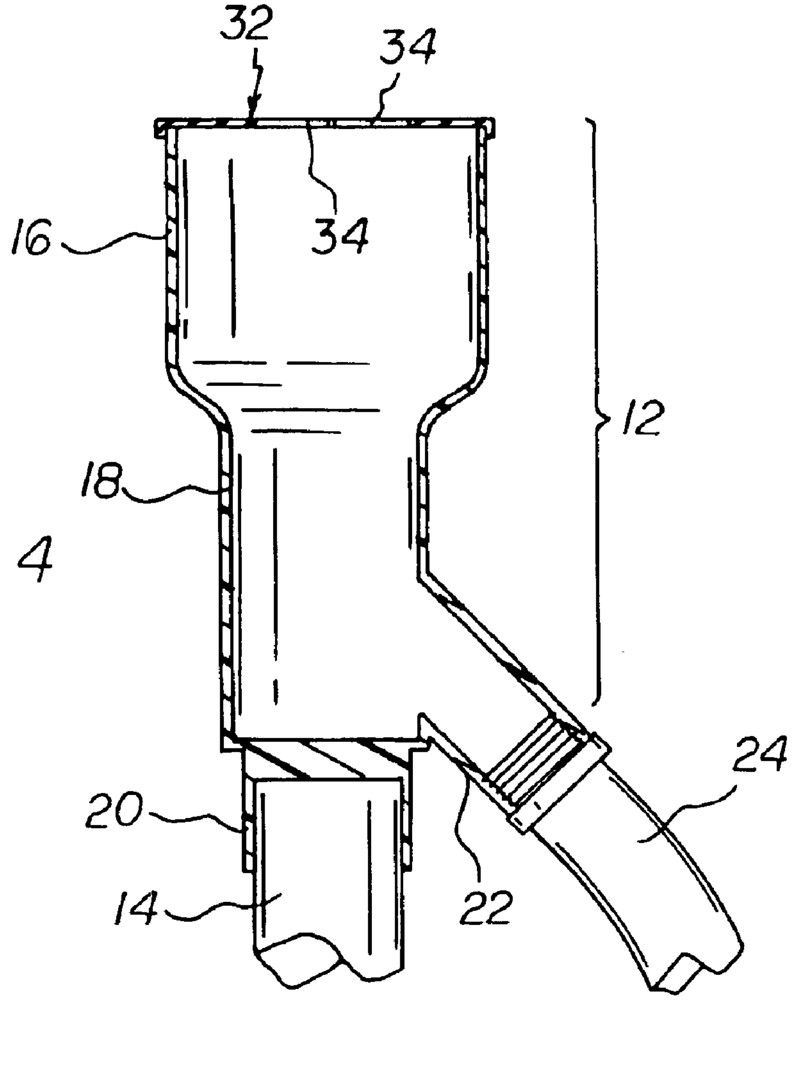
FIG 4

FIG 5
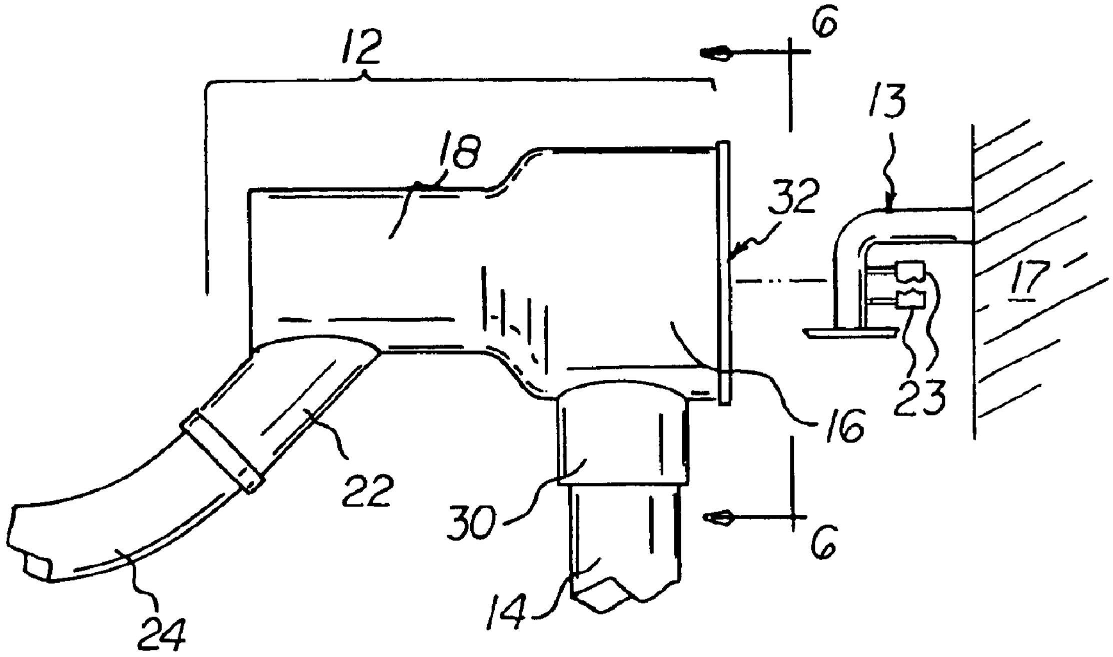
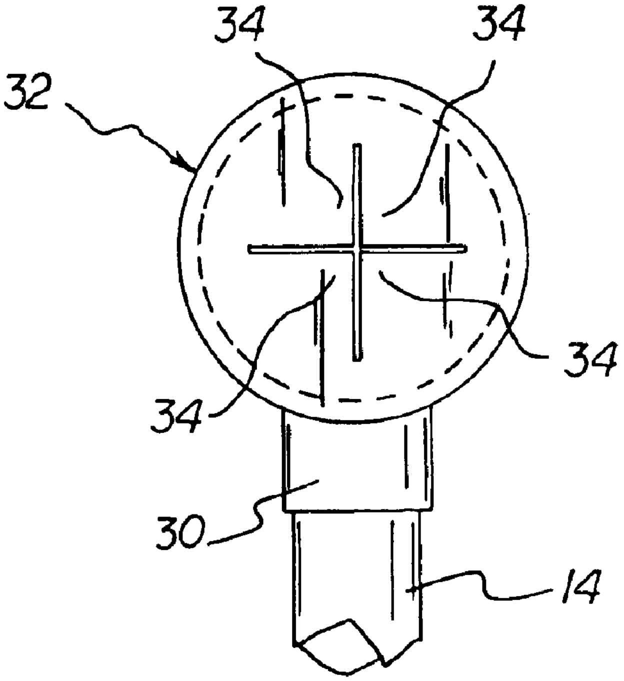
FIG 6

FIRE SPRINKLER WATER CATCHING APPARATUS

CROSS-REFERENCE TO RELATED APPLICATION

This application claims priority based upon my copending Provisional Application Ser. No. 60/430,134; filed Dec. 2, 2002.

BACKGROUND OF THE INVENTION

1. Field of the Invention

The present invention relates generally to devices supported at the top of vertically oriented poles, and, more particularly, to a device supported at the top of a vertically oriented pole that is especially adapted for use to catch and carry away unwanted water that is sprayed from a fire sprinkler when the fire sprinkler is spraying water at an unwanted time, such as when a fusible link on the fire sprinkler is accidentally broken.

2. Description of the Prior Art

The supporting of a number of devices at the top of a vertically oriented pole is well known in the art, and the following U.S. patent represents one of those devices: U.S. Pat. No. 4,339,048. More specifically, U.S. Pat. No. 4,339,048 discloses a garbage bag holder that is supported at the top of a vertically oriented pole. The device has an open mesh structure and, as a result, is not capable of serving as a container for a liquid, such as water. Fire sprinklers are most often mounted on a ceiling, and if a sprinkler is emitting water at an unwanted time, it would be desirable for a pole-mounted container to capture unwanted water flowing from a ceiling-mounted sprinkler.

Devices that serve as containers and that have liquid drainage capabilities are well known in the art, and the following U.S. patents represent some of these devices: U.S. Pat. Nos. 4,373,547, 4,546,900, and 5,183,280. It is noted, however, that none of these devices is mounted at the top of a vertically oriented pole, and none of the these devices serves as a container and drain for water that is emitted from a ceiling-mounted sprinkler. Since unwanted water flowing from a sprinkler may quickly fill up a container, it would be desirable if a container for water flowing from a sprinkler also has a drainage feature.

U.S. Pat. No. 5,725,009 may be of interest for its disclosure of a fitting removal fluid discharge bag.

Still other features would be desirable in a fire sprinkler water catching apparatus. For example, water from a sprinkler that sprays into a funnel-like container may splash out from the container, it would be desirable if flexible flaps were provided on the funnel-like container to prevent water from splashing out from the container.

Since the heights of ceilings vary, and since the heights of people using the pole device of the present invention also vary, it would be desirable if the pole has a variably adjustable pole length.

At times, sprinklers are mounted on a vertically oriented surface, such as a wall. In this respect, it would be desirable if the device of the invention has adaptability to capture and drain water from wall-mounted sprinklers.

Thus, while the foregoing body of prior art indicates it to be well known to use containers have drainage features, the prior art described above does not teach or suggest a fire sprinkler water catching apparatus which has the following combination of desirable features: (1) provides a pole-mounted container to capture unwanted water flowing from a ceiling-mounted sprinkler; (2) provides a container for water flowing from a sprinkler wherein the container also has a drainage feature; (3) has flexible flaps on the funnel-like container to prevent water from splashing out from the container; (4) provides a pole which has a variably adjustable pole length; and (5) has adaptability to capture and drain water from wall-mounted sprinklers. The foregoing desired characteristics are provided by the unique fire sprinkler water catching apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a fire sprinkler water catching apparatus which includes a funnel member which has a funnel top portion, a funnel bottom portion, a funnel drain portion connected to the funnel bottom portion, and a pole-reception fitting. A drain hose is connected to the funnel drain portion. The end of a support pole is received in the pole-reception fitting. The fire sprinkler water catching apparatus of the invention is used to catch and carry away unwanted water that is sprayed from a fire sprinkler when the fire sprinkler is spraying water at an unwanted time, such as when a fusible link on the fire sprinkler is accidentally broken.

Preferably, the funnel top portion and the funnel bottom portion are aligned along a longitudinal axis.

In accordance with one aspect of the invention, the pole-reception fitting is a bottom-mounted pole-reception fitting. In this respect, the funnel top portion, the funnel bottom portion, and the bottom-mounted pole-reception fitting are aligned along the longitudinal axis.

Preferably, a flexible funnel cover is fitted onto the top of the funnel top portion. The flexible funnel cover includes a plurality of flexible and resilient funnel cover flaps.

Preferably, the support pole is a telescopic support pole. In this respect, the telescopic support pole includes a top telescopic pole portion, a bottom telescopic pole portion connected to the top telescopic pole portion, and a locking member for locking the top telescopic pole portion with respect to the bottom telescopic pole portion.

In accordance with another aspect of the invention, the pole-reception fitting is a side-mounted pole-reception fitting for use in receiving a telescopic support pole when the apparatus of the invention is used to cover a wall-mounted fire sprinkler.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fire sprinkler water catching apparatus which has all of the advantages of the prior art and none of the disadvantages.

It is another object of the present invention to provide a new and improved fire sprinkler water catching apparatus which may be easily and efficiently manufactured and marketed.

It is a further object of the present invention to provide a new and improved fire sprinkler water catching apparatus which is of durable and reliable construction.

An even further object of the present invention is to provide a new and improved fire sprinkler water catching apparatus which is susceptible of a low cost of manufacture with regard to both materials and labor, and which accordingly is then susceptible of low prices of sale to the consuming public, thereby making such fire sprinkler water catching apparatus available to the buying public.

Still yet a further object of the present invention is to provide a new and improved fire sprinkler water catching apparatus which provides a pole-mounted container to capture unwanted water flowing from a ceiling-mounted sprinkler.

Still another object of the present invention is to provide a new and improved fire sprinkler water catching apparatus that provides a container for water flowing from a sprinkler wherein the container also has a drainage feature.

Yet another object of the present invention is to provide a new and improved fire sprinkler water catching apparatus which has flexible flaps on the funnel-like container to prevent water from splashing out from the container.

Even another object of the present invention is to provide a new and improved fire sprinkler water catching apparatus that provides a pole which has a variably adjustable pole length.

Still a further object of the present invention is to provide a new and improved fire sprinkler water catching apparatus which has adaptability to capture and drain water from wall-mounted sprinklers.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a top view of the embodiment of the fire sprinkler water catching apparatus of FIG. 2 taken along line 3—3 thereof.

FIG. 4 is a cross-sectional view of the embodiment of the invention shown in FIG. 3 taken along line 4—4 thereof.

FIG. 5 is a partial side view of the top portion of a second embodiment of the fire sprinkler water catching apparatus of the invention which includes a side-mounted pole-reception fitting for receiving a telescopic support pole for supporting the apparatus over a wall-mounted fire sprinkler.

FIG. 6 is a front view of the embodiment of the invention shown in FIG. 5 taken along line 6—6 thereof.

DESCRIPTION OF THE PREFERRED EMBODIMENT

Figure 1:
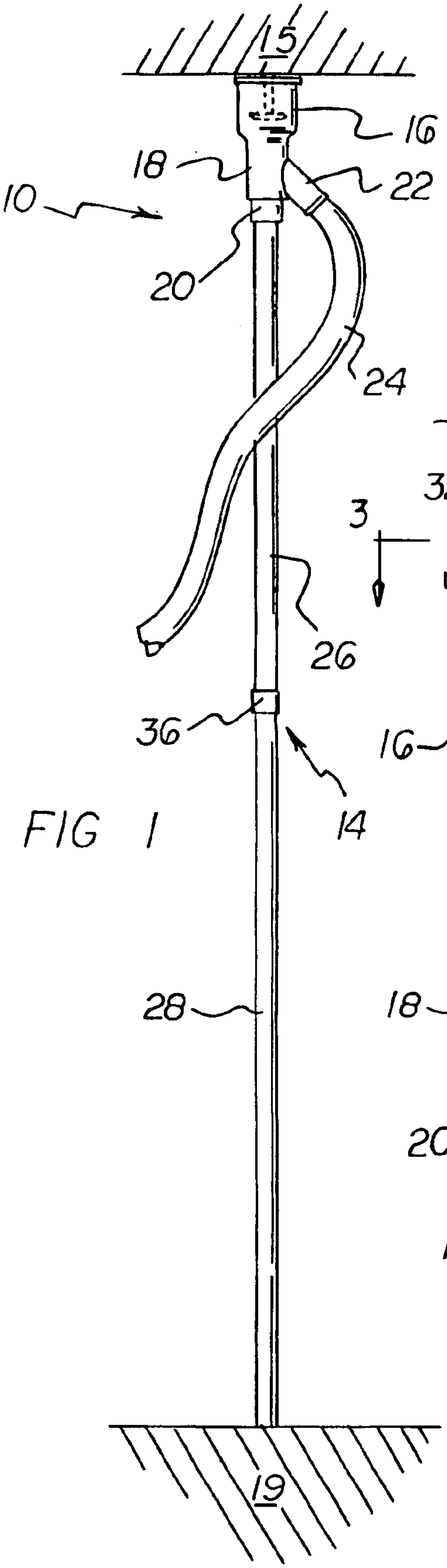
FIG. 1 is a side view showing a first embodiment of the fire sprinkler water catching apparatus of the invention installed over an overhead fire sprinkler and including a telescopic support pole.

With reference to the drawings, a new and improved fire sprinkler water catching apparatus embodying the principles and concepts of the present invention will be described.

Turning to FIGS. 1–4, there is shown a first embodiment of the fire sprinkler water catching apparatus of the invention generally designated by reference numeral 10. In the first embodiment, fire sprinkler water catching apparatus 10 includes a funnel member 12 which has a funnel top portion 16, a funnel bottom portion 18, a funnel drain portion 22 connected to the funnel bottom portion 18, and a pole-reception fitting. A drain hose 24 is connected to the funnel drain portion 22. The end of a support pole is received in the pole-reception fitting. The fire sprinkler water catching apparatus 10 of the invention is used to catch and carry away unwanted water that is sprayed from a fire sprinkler when the fire sprinkler is spraying water at an unwanted time, such as when a fusible link 23 on the fire sprinkler is accidentally broken.

The funnel drain portion 22 and the drain hose 24 can be connected together by a threaded connection. Preferably, the funnel top portion 16 and the funnel bottom portion 18 are aligned along a longitudinal axis 38.

In accordance with one aspect of the invention, the pole-reception fitting is a bottom-mounted pole-reception fitting 20. In this respect, the funnel top portion 16, the funnel bottom portion 18, and the bottom-mounted pole-reception fitting 20 are aligned along the longitudinal axis 38.

Preferably, a flexible funnel cover 32 is fitted onto the top of the funnel top portion 16. The flexible funnel cover 32 includes a plurality of flexible and resilient funnel cover flaps 34.

Preferably, the support pole is a telescopic support pole 14. In this respect, the telescopic support pole 14 includes a top telescopic pole portion 26, a bottom telescopic pole portion 28 connected to the top telescopic pole portion 26, and a locking member 36 for locking the top telescopic pole portion 26 with respect to the bottom telescopic pole portion 28.

Turning to FIGS. 5 and 6, a second embodiment of the invention is shown. Reference numerals are shown that correspond to like reference numerals that designate like elements shown in the other figures. In addition, the pole-reception fitting is a side-mounted pole-reception fitting 30.

As shown in the drawings, the second embodiment of the invention is mounted on a wall-mounted fire sprinkler 13 that projects out from a wall 17. The side-mounted pole-reception fitting 30 is used for receiving the telescopic support pole 14.

To use either embodiment of the invention, a telescopic support pole 14 is fitted into a respective pole-reception fitting. For use with an overhead fire sprinkler 11, the telescopic support pole 14 is fitted into a bottom-mounted pole-reception fitting 20. For use with a wall-mounted fire sprinkler 13, the telescopic support pole 14 is fitted into a side-mounted pole-reception fitting 30.

Figure 2:
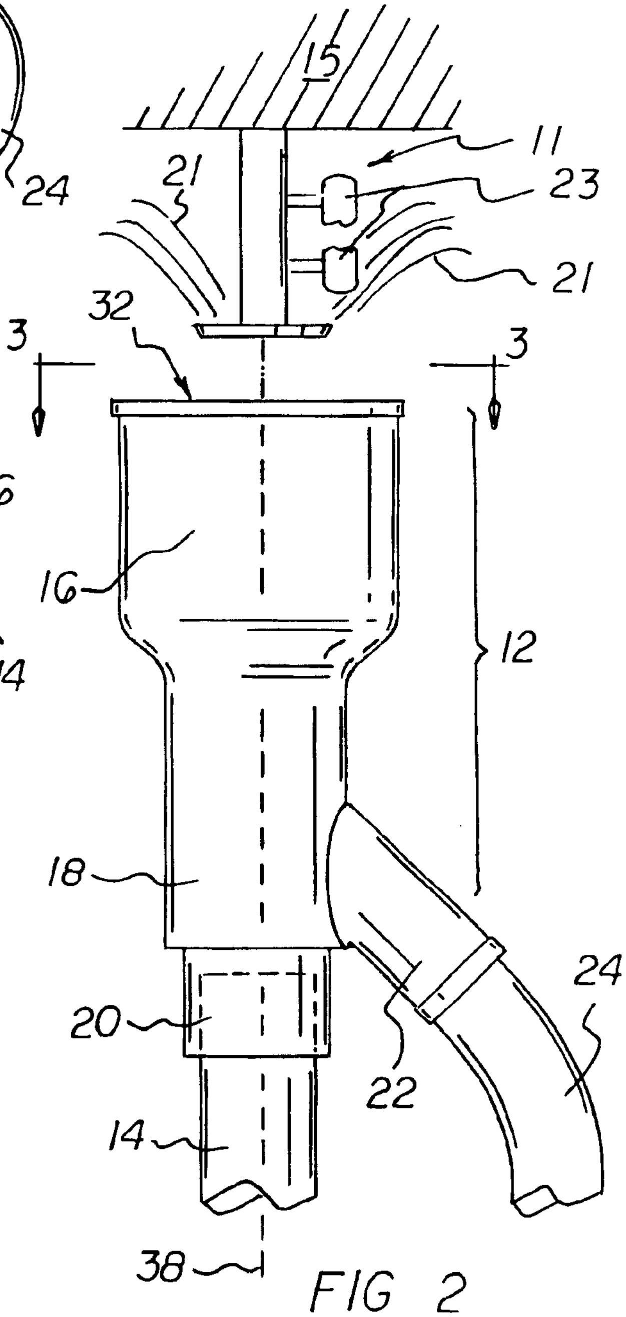
FIG. 2 is an enlarged, partial side view of the top portion of the embodiment of the fire sprinkler water catching apparatus shown in FIG. 1, about to be installed on an overhead fire sprinkler.

Once the user fits the free end of the telescopic support pole 14 into the respective pole-reception fitting, the user grasps the telescopic support pole 14 and positions the flexible funnel cover 32 adjacent to the respective fire sprinkler. Then, the flexible funnel cover 32 is pushed over the fire sprinkler. When this is done, the flexible and resilient funnel cover flaps 34 yield to the fire sprinkler and ride over the fire sprinkler. Once the flexible funnel cover flaps 34 reach the stem of the fire sprinkler, the flexible and resilient funnel cover flaps 34 substantially close around the stem of the fire sprinkler and are located behind the nozzles of the fire sprinkler. As a result, water that is sprayed backward from the fire sprinkler, shown as sprayed water 21 in FIG. 2, is caught by the flexible funnel cover flaps 34 which are located behind the nozzles of the fire sprinkler, and the sprayed water is deflected by the flexible funnel cover flaps 34 toward the funnel member 12.

Water from the respective fire sprinkler is caught by the funnel member 12 and drains out from the funnel drain portion 22 and the drain hose 24. Preferably, the drain hose 24 is directed to a convenient water drain (not shown).

Once the flexible funnel cover flaps 34 and the funnel member 12 are fitted over the fire sprinkler, the top telescopic pole portion 26 and the bottom telescopic pole portion 28 can be adjusted relative to each other so that the telescopic support pole 14 nearly spans the distance between the ceiling 15 and the floor 19. Once this adjustment is made, the locking member 36 can be adjusted to the lock the top telescopic pole portion 26 with respect to the bottom telescopic pole portion 28. As a result, as shown in FIG. 1, the fire sprinkler water catching apparatus 10 of the invention is self-standing as it catches water from the fire sprinkler and directs such caught water to a drain.

When the fire sprinkler is turned off, the fire sprinkler water catching apparatus 10 can be removed from the fire sprinkler. That is, the locking member 36 is unlocked, and the top telescopic pole portion 26 is moved with respect to the bottom telescopic pole portion 28 to reduce the overall length of the telescopic support pole 14. Then, the funnel member 12 is pulled away from the fire sprinkler. When this is done, the flexible funnel cover flaps 34 are opened, and the funnel member 12 is removed from the fire sprinkler.

When not in use, the telescopic support pole 14 can be separated from the funnel member 12, and the drain hose 24 can be separated from the funnel drain portion 22. The telescopic support pole 14, the funnel member 12, and the drain hose 24 can be stored together as a kit for future use.

Another embodiment of the invention (not shown) can employ hooks on the apparatus that can be activated by a lever or ropes. The hooks allow the apparatus to be clamped around an overhead sprinkler pipe.

The components of the fire sprinkler water catching apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved fire sprinkler water catching apparatus that is low in cost, relatively simple in design and operation, and which may advantageously be used to capture unwanted water flowing from a ceiling-mounted sprinkler. With the invention, a fire sprinkler water catching apparatus provides a container for water flowing from a sprinkler wherein the container also has a drainage feature. With the invention, a fire sprinkler water catching apparatus is provided which has flexible flaps on the funnel-like container to prevent water from splashing out from the container. With the invention, a fire sprinkler water catching apparatus provides a pole which has a variably adjustable pole length. With the invention, a fire sprinkler water catching apparatus is provided which has adaptability to capture and drain water from wall-mounted sprinklers.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A fire sprinkler water catching apparatus for use in connection with a fire sprinkler mounted on a support surface, said apparatus comprising:

a funnel member which includes a funnel top portion, a funnel bottom portion, a funnel drain portion connected to said funnel bottom portion, and a pole-reception fitting, a drain hose connected to said funnel drain portion, and a support pole received in said pole-reception fitting, said apparatus further including:

a flexible funnel cover fitted to the top of said funnel top portion, wherein said flexible funnel cover includes a plurality of flexible funnel cover flaps, wherein said flexible funnel cover extends across substantially the entire peripheral extent of said funnel top portion and is adapted to sealingly engage said fire sprinkler support surface, and wherein the peripheral extent of said funnel top portion is greater than the peripheral extent of said fire sprinkler.

2. The apparatus of claim 1 wherein said funnel top portion and said funnel bottom portion are aligned along a longitudinal axis.

3. The apparatus of claim 1 wherein said pole-reception fitting is a bottom-mounted pole-reception fitting.

4. The apparatus of claim 1 wherein said funnel top portion, said funnel bottom portion, and said bottom-mounted pole-reception fitting are aligned along said longitudinal axis.

5. The apparatus of claim 1 wherein said support pole is a telescopic support pole.

6. The apparatus of claim 5 wherein said telescopic support pole includes a top telescopic pole portion, a bottom telescopic pole portion connected to said top telescopic pole portion, and a locking member for locking said top telescopic pole portion with respect to said bottom telescopic pole portion.

7. The apparatus of claim 1 wherein said pole-reception fitting is a side-mounted pole-reception fitting.

* * * * *